March 11, 1924.
A. P. LADD
1,486,148
MATCH, CIGAR, AND ASH HOLDER
Filed June 9, 1921
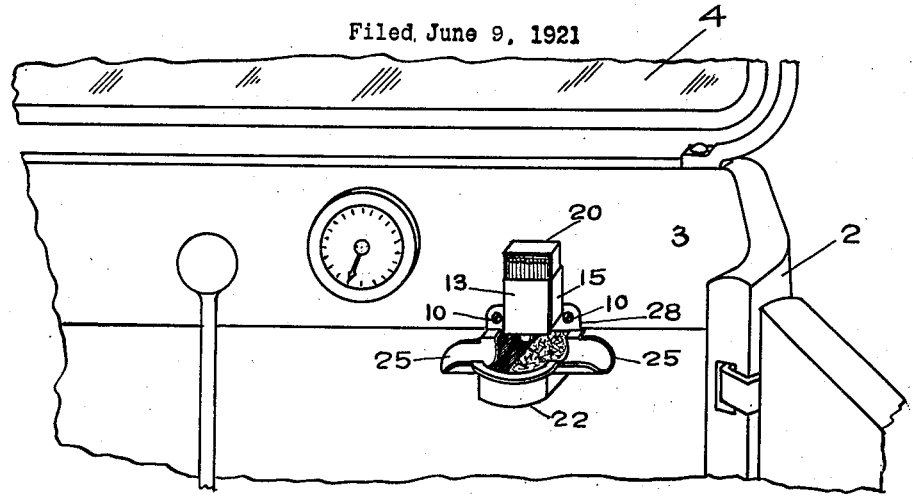
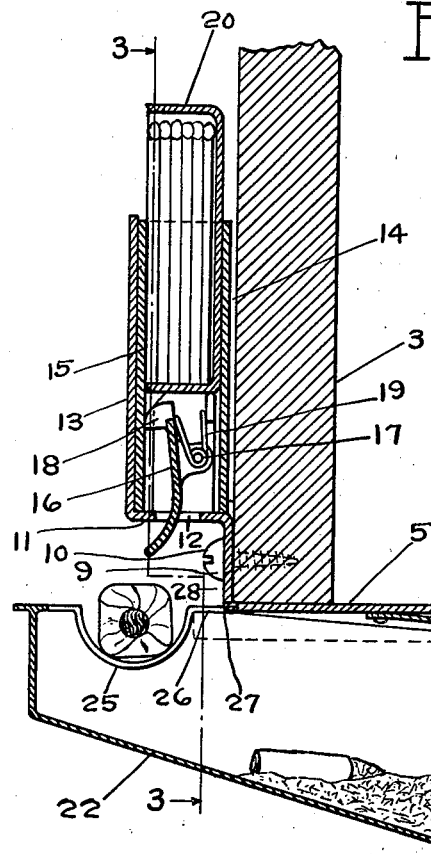
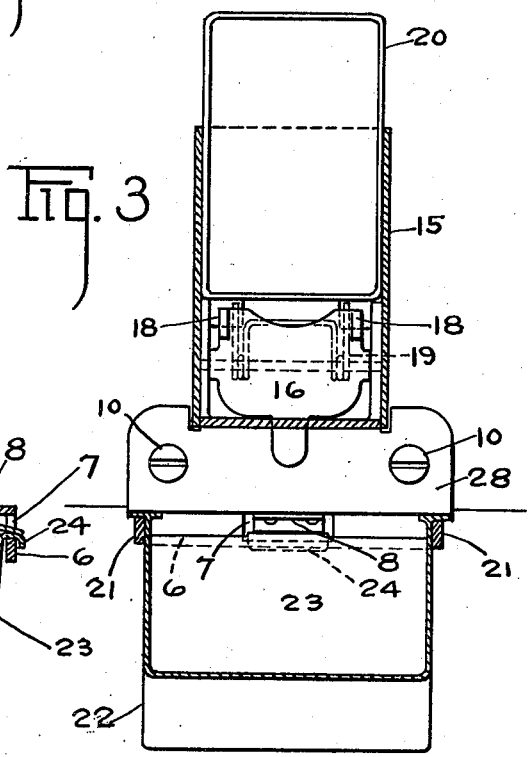
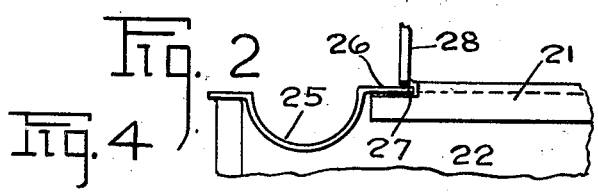
INVENTOR
ARCHER P. LADD
By Paul Paul
His Attorneys Patented Mar. 11, 1924.

1,486,148

UNITED STATES PATENT OFFICE.

ARCHER P. LADD, OF MINNEAPOLIS, MINNESOTA.

MATCH, CIGAR, AND ASH HOLDER.

Application filed June 9, 1921. Serial No. 476,267.

*To all whom it may concern:*

Be it known that I, ARCHER P. LADD, a citizen of the United States, resident of Minneapolis, county of Hennepin, State of Minnesota, have invented certain new and useful Improvements in Match, Cigar, and Ash Holders, of which the following is a specification.

The object of my invention is to provide a device adapted to be mounted on the instrument board of an automobile to enable the driver of the car to obtain and light a match with one hand and thereby avoid the necessity and danger of removing both hands from the steering wheel.

A further object is to provide a device embodying a receptacle for ashes, cigar and cigarette stubs and also having a support whereon a cigar and cigarette partially smoked may be placed in case the driver wishes to step out of the car for any purpose or has something to do around the gasolene supply, where it would be dangerous to hold a burning cigarette or cigar. The device may also be utilized as a support for a pipe, if desired.

The invention consists generally in various constructions and combinations, all as hereinafter described and particularly pointed out in the claims.

In the accompanying drawings forming part of this specification,

Figure 1 is a view of a portion of the instrument board of an automobile, showing my invention applied thereto, Figure 2 is a vertical sectional view, showing the manner of mounting the device on the instrument board, Figure 3 is a vertical sectional view on the line 3—3 of Figure 2.

Figure 4 is a detail view.

In the drawing, 2 represents a portion of the side wall of the tonneau of the car, 3 the instrument board and 4 the wind shield. On this board various instruments are mounted by means of which the condition of the motor and the quantity of gasolene on hand is indicated to the driver of the car in the usual well-known way.

5 is a plate fashioned to fit the lower edge of the instrument board and having a depending flange 6 provided with a slot 7 into which a flat spring 8 projects. An upwardly turned part 9 fits the forward lower portion of the board and is secured thereto by screws 10, or other suitable means. A forwardly turned portion 11 of the plate has a slot 12 therein and terminates in a vertical extension 13 between which and the board a pocket 14 is formed that is adapted to receive a box of matches. 15 represents the sliding cover of the box, open at each end and adapted to rest on the part 11. 16 is a lever pivoted at 17 and having a dog 18 to engage the cover and lock it in the pocket, a spring 19 providing sufficient tension to yieldingly hold the dog in engagement with the cover. The box portion 20 containing the matches is then free to slide in the cover above the locking means and will be supported, as shown in Figure 2, a sufficient distance above the cover to allow the ready insertion of the finger and the removal of a match from the box with one hand.

The side walls of the cover having the usual emery cloth surface will be exposed and the user of the device can readily scratch a match thereon, the cover being rigidly held in the pocket by the spring actuated lever. The plate 5, in addition to the end flange, has depending side flanges 21. The lower end of the lever 16 depends through the slot 12 where it can be conveniently reached by the user of the device to withdraw the dog from engagement with the box cover and permit its removal from the pocket. An ash receive 22 consisting preferably of a metallic box having an inclined bottom to direct the ashes and cigar and cigarette stubs toward the forward portion of the box, is provided to fit under the plate 5, having an end wall 23 with a lip 24 thereon to enter the slot 7 and be held therein by the tension of the spring 8. The top of the box is open and provided with curved rests 25 for a cigar or cigarette or pipe and lugs 26 extend from these rests on one side and are adapted to project into openings 27 provided between the forward ends of the flanges 21 and lugs 28 on the wall 9 that is seated against the front of the instrument board. When these lugs are inserted into the sockets, the ash receptacle can not accidentally become detached from the instrument board or the supporting plate. It may, however, be easily and quickly removed by raising the spring 8 sufficiently to permit the lip 24 to be disengaged from the flange 6. This may be accomplished by pressing upwardly on the bottom of the box and sliding it forward until the lip 24 is disengaged from the flange 6. The plate supporting the ash receptacle, when once mounted on the instrument board, need not be disturbed, but whenever desired, the ash receptacle can be removed and emptied of its contents and the match box may, of course, be readily renewed when the matches have been used.

I claim as my invention:

1. A device of the class described adapted to be attached to a vehicle instrument board and comprising a waste receptacle arranged beneath said board and extending in the front and the rear thereof, and removably connected thereto, the forward portion of said receptacle having an opening for the deposit of ashes and other waste, and said receptacle being mounted to direct such waste to a point under said board where it will be concealed from the vehicle riders and a match holder above and adjacent the forward portion of said receptacle.

2. A device of the class described comprising a match-box pocket adapted to be secured to the lower portion of an instrument board, and an ash-receiver removably mounted beneath said pocket and having an exposed waste-receiving opening in front of said board and projecting in the rear of said board, and spring pressed means for holding said receiver in its normal position.

3. A device of the class described comprising a plate adapted to be secured to the lower portion of a vehicle instrument board and having a matchbox pocket thereon, an ash and waste receiver having a seat in said plate beneath said instrument board, a spring actuated catch for holding said receiver in its seat, said receiver having a forward and a backward movement to engage it with its seat or disengage it therefrom.

4. A device of the class described adapted to be secured to a vehicle instrument board comprising a plate having an upper portion with a pocket for a matchbox, and a lower portion extending beneath and in the rear of said board and secured thereto, said lower portion being provided with a depending flange, a waste receptacle fitting beneath said board and having means for engagement with said flange, and extending partially in front and partially in the rear of said board, and provided with an opening in its forward portion for deposit of the ashes therein, and also having suitable cigarette and cigar rests.

5. A device of the class described comprising a match box pocket adapted to be secured to a vehicle instrument board, and an ash receiver mounted beneath said pocket and having a forward waste receiving opening and a rear chamber for the waste material and spring pressed means for holding said receiver in its normal position.

6. A pocket having a lower slotted wall and an upward extension thereof forming a seat for a matchbox, a spring-pressed clamping lever mounted within said pocket above said slotted wall and having an end projecting through the slot in said wall in position to be grasped by the finger of the user, said lever being adapted to grip and hold the cover of the box against said extension, the box body being free to slide vertically in the cover and expose the matches above the pocket.

7. A device of the class described comprising a plate adapted to be secured to an upright support and having a match box pocket thereon, an ash and waste receiver having a seat in said plate, a spring catch for holding said receiver in its seat, said receiver having a sliding movement toward and from said seat to engage it therewith or disengage it therefrom.

In witness whereof, I have hereunto set my hand this 1st day of June, 1921.

ARCHER P. LADD.